US010808082B2

(12) United States Patent
Tomisaki et al.

(10) Patent No.: US 10,808,082 B2
(45) Date of Patent: Oct. 20, 2020

(54) METHOD FOR KNEADING A POLYMER

(71) Applicant: Sumitomo Rubber Industries, Ltd., Kobe-shi, Hyogo (JP)

(72) Inventors: Yukari Tomisaki, Kobe (JP); Ryoji Kojima, Kobe (JP); Tsuyoshi Tsuchida, Kobe (JP); Ayaka Kitaou, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/443,494

(22) Filed: Jun. 17, 2019

(65) Prior Publication Data
US 2019/0300658 A1  Oct. 3, 2019

Related U.S. Application Data

(62) Division of application No. 15/784,930, filed on Oct. 16, 2017, now abandoned.

(30) Foreign Application Priority Data

Oct. 31, 2016  (JP) .................................. 2016-213181

(51) Int. Cl.
C08J 3/20 (2006.01)
C08L 9/00 (2006.01)
B29B 7/02 (2006.01)
B29B 7/18 (2006.01)
B29B 7/74 (2006.01)
B29B 7/00 (2006.01)
B29B 7/56 (2006.01)

(52) U.S. Cl.
CPC ............... *C08J 3/203* (2013.01); *B29B 7/005* (2013.01); *B29B 7/183* (2013.01); *B29B 7/7461* (2013.01); *B29B 7/7495* (2013.01); *C08L 9/00* (2013.01); *B29B 7/56* (2013.01); *C08J 2309/00* (2013.01)

(58) Field of Classification Search
USPC ........................................ 528/502 F; 366/97
See application file for complete search history.

(56) References Cited

U.S. PATENT DOCUMENTS 3,414,557 A * 12/1968 Kraus ..................... C08J 3/00
528/481
4,124,051 A 11/1978 Horton
4,945,964 A 8/1990 Takiguchi et al.
5,017,660 A 5/1991 Hattori et al.
5,191,003 A 3/1993 Inui et al.
5,385,459 A 1/1995 Graves et al.
5,627,237 A 5/1997 Halasa et al.
5,711,904 A 1/1998 Eswaran et al.
5,804,644 A 9/1998 Nakafutami et al.
6,058,994 A 5/2000 Amino et al.
9,127,145 B2 9/2015 Tanabe
10,189,974 B2 1/2019 Takenaka et al.
2001/0016629 A1 8/2001 Mori et al.
2004/0242797 A1 12/2004 Stere et al.
2004/0254301 A1 12/2004 Tsukimawashi et al.
2005/0119414 A1 6/2005 Sasagawa et al.
2005/0119452 A1 6/2005 Yamaguchi et al.
2005/0234193 A1 10/2005 Sasagawa et al.
2005/0277750 A1 12/2005 Masaki et al.
2006/0167160 A1 7/2006 Nakagawa et al.
2007/0078202 A1 4/2007 Mihara et al.
2007/0276090 A1 11/2007 Aoki et al.
2010/0036057 A1 2/2010 Mori
2011/0136962 A1 6/2011 Hattori et al.
2011/0144236 A1 6/2011 Mihara
2011/0166254 A1 7/2011 Nishimura
2011/0184084 A1 7/2011 Katou
2012/0016056 A1 1/2012 Miyazaki
2012/0065325 A1* 3/2012 Nakayama ................ B60C 1/00
524/575.5
2012/0148917 A1 6/2012 Kobayashi et al.
2012/0283354 A1 11/2012 Hattori et al.

(Continued)

FOREIGN PATENT DOCUMENTS

CN    1156467 A    8/1997
CN    1541245 A    10/2004

(Continued)

OTHER PUBLICATIONS

Longxing Chemical Stock Company Limited, "China Rubber Industry Year Book," 2010-2011, pp. 19 (9 pages total), with concise explanation of relevance.
Database WPI Week 200661, "Rubber Composition for Pneumatic Tire, is Formed by Mixing Specific Hydrogenated Styrene-butadiene Copolymer and Aromatic Vinyl Compound Conjugated Diene . . . ," Thomson Scientific, London, GB, AN 2006-589923, Aug. 17, 2006, 2 pages, XP002770767.
Written Opinion of the International Searching Authority and International Search Report, dated Oct. 13, 2015, for International Application No. PCT/JP2015/069823, with an English translation of the International Search Report.
"Polymer Chemistry and Physics," Light Industry Press, Feb. 28, 1981, p. 351 (2 pages total).

(Continued)

*Primary Examiner* — Fred M Teskin
(74) *Attorney, Agent, or Firm* — Birch, Stewart, Kolasch & Birch, LLP

(57) ABSTRACT

Provided are a polymer ready for introduction into a kneading machine which is milled with good milling efficiency in a kneading machine and which provides a kneaded mixture with excellent filler dispersion, and a rubber composition and a pneumatic tire containing the polymer. The present invention relates to a polymer ready for introduction into a kneading machine, excluding natural rubber, the polymer having a temperature within the range of −20° C. to 80° C. and satisfying the following formula (I):

(Tip clearance $d$ of kneading machine)$^3 \leq$(Volume $V$ of polymer ready for introduction into kneading machine)$\leq 2.0 \times 10^4$ cm$^3$   (I).

9 Claims, No Drawings

(56) References Cited

U.S. PATENT DOCUMENTS

| | | |
|---|---|---|
| 2012/0325391 A1 | 12/2012 | Miyazaki |
| 2013/0079464 A1 | 3/2013 | Nishioka et al. |
| 2014/0090764 A1 | 4/2014 | Miyazaki |
| 2014/0329930 A1 | 11/2014 | Sato |
| 2014/0371372 A1 | 12/2014 | Hirayama |
| 2015/0031839 A1 | 1/2015 | Washizu |
| 2015/0361210 A1 | 12/2015 | Nosaka et al. |
| 2015/0368387 A1 | 12/2015 | Nosaka et al. |
| 2016/0339743 A1 | 11/2016 | Abad et al. |
| 2017/0066910 A1 | 3/2017 | Miura |
| 2017/0226233 A1 | 8/2017 | Yamashiro et al. |
| 2017/0226331 A1 | 8/2017 | Ishino et al. |
| 2017/0233562 A1 | 8/2017 | Yamada et al. |
| 2017/0240731 A1 | 8/2017 | Yamashiro et al. |
| 2018/0142089 A1 | 5/2018 | Yamashiro |

FOREIGN PATENT DOCUMENTS

| | | |
|---|---|---|
| CN | 1576279 A | 2/2005 |
| CN | 101412515 A | 4/2009 |
| CN | 101990558 A | 3/2011 |
| CN | 102093602 A | 6/2011 |
| CN | 106519351 A | 3/2017 |
| EP | 0775725 A1 | 5/1997 |
| EP | 1258498 A1 | 11/2002 |
| EP | 2236554 A1 | 10/2010 |
| EP | 2757131 A1 | 7/2014 |
| EP | 2960286 A1 | 12/2015 |
| EP | 2963087 A1 | 1/2016 |
| EP | 3064545 A1 | 9/2016 |
| EP | 3162846 A1 | 5/2017 |
| EP | 3208108 A1 | 8/2017 |
| JP | 2-147647 A | 6/1990 |
| JP | 6-9822 A | 1/1994 |
| JP | 7-76635 A | 3/1995 |
| JP | 8-59898 A | 3/1996 |
| JP | 10-182884 A | 7/1998 |
| JP | 2000-119445 A | 4/2000 |
| JP | 2000-344955 A | 12/2000 |
| JP | 2001-81243 A | 3/2001 |
| JP | 2002-12704 A | 1/2002 |
| JP | 2002-212340 A | 7/2002 |
| JP | 2003-41059 A | 2/2003 |
| JP | 2003-160735 A | 6/2003 |
| JP | 2003-277560 A | 10/2003 |
| JP | 2006-213807 A | 8/2006 |
| JP | 2006-249188 A | 9/2006 |
| JP | 2007-137491 A | 6/2007 |
| JP | 4060105 B2 | 3/2008 |
| JP | 2008-174696 A | 7/2008 |
| JP | 2008-184517 A | 8/2008 |
| JP | 2008-248203 A | 10/2008 |
| JP | 2010-242019 A | 10/2010 |
| JP | 2010-265379 A | 11/2010 |
| JP | 2011-1435 A | 1/2011 |
| JP | 2011-140613 A | 7/2011 |
| JP | 2011-144239 A | 7/2011 |
| JP | 2011-153293 A | 8/2011 |
| JP | 2011-236368 A | 11/2011 |
| JP | 2011-252116 A | 12/2011 |
| JP | 2012-52028 A | 3/2012 |
| JP | 2012-153810 A | 8/2012 |
| JP | 2012-188537 A | 10/2012 |
| JP | 2013-18868 A | 1/2013 |
| JP | 2013-28783 A | 2/2013 |
| JP | 2013-35902 A | 2/2013 |
| JP | 2013-82778 A | 5/2013 |
| JP | 2013-166827 A | 8/2013 |
| JP | 2013-224391 A | 10/2013 |
| JP | 2013-249421 A | 12/2013 |
| JP | 2013-253207 A | 12/2013 |
| JP | 2014-24913 A | 2/2014 |
| JP | 2014-80451 A | 5/2014 |
| JP | 2014-95018 A | 5/2014 |
| JP | 2014-105296 A | 6/2014 |
| JP | 2014-125546 A | 7/2014 |
| JP | 2014-133827 A | 7/2014 |
| JP | 2014-133828 A | 7/2014 |
| JP | 2015-54875 A | 3/2015 |
| JP | 2015-110703 A | 6/2015 |
| JP | 2017-52874 A | 3/2017 |
| WO | WO 2009/060931 A1 | 5/2009 |
| WO | WO 2013/099324 A1 | 7/2013 |
| WO | WO 2013/125614 A1 | 8/2013 |
| WO | WO 2014/126184 A1 | 8/2014 |
| WO | WO 2014/133097 A1 | 9/2014 |
| WO | WO 2015/064646 A1 | 5/2015 |
| WO | WO 2016/039008 A1 | 3/2016 |

OTHER PUBLICATIONS

ASTM, "Standard Test Method for Carbon Black-CTAB (Cetyltrimethylammonium Bromide) Surface Area (Withdrawn 2007)," ASTM D3765-04, 2004, XP-002778471, 3 pages.

ASTM "Standard Test Methods for Carbon Black-Surface Area by Multipoint B.E.T. Nitrogen Adsorption (Withdrawn 2000)," ASTM D4820-99, 1999, XP-002778482, 2 pages.

ASTM "Standard Test Methods for Carbon Black-Surface Area by Nitrogen Adsorption (Withdrawn 1999)," ASTM D3037-93: 1993, XP-002778481, 2 pages.

Author Unknown, "Carbon Black Production and Application Manual," Sep. 30, 2000, 8 pages total.

Chinese Office Action and Search Report for Chinese Application No. 201580045221.3, dated Mar. 30, 2018, with an English translation of the Office Action.

Database WPI Week 200661, "Rubber Composition for Pneumatic Tire, is Formed by Mixing Specific Hydrogenated Styrene-butadiene Copolymer and Aromatic Vinyl Compound Conjugated Dienei . . . .," Thomson Scientific: London, GB, AN 20060-589923, Aug. 17, 2006, 2 pages, XP002770767.

English translation of the Chinese Office Action for Application No. 201580044378.4, dated Aug. 16, 2018.

English translation of the Chinese Office Action for Application No. 201580044936.7, dated Mar. 30, 2018.

English translation of the Chinese Office Action for Application No. 201580044936.7, dated Nov. 16, 2018.

Sanshin Chemical Industry, "Sanceler TBZTD," retrieved from URL:http:www.sanshin-ci.co.jp/eng/index/syouhin/1/sanceler_tbztd.htm, retrieved Dec. 17, 2018 1 page.

Written Opinion of the International Searching Authority and English translation of the International Search Report, dated Oct. 13, 2015, for International Application No. PCT/JP2015/069836.

Written Opinion of the International Searching Authority and International Search Report dated Oct. 13, 2015, for International Application No. PCT/JP2015/069823, with an Engiish translation of the International Search Report.

Written Opinion of the International Searching Authority and International Search Report, dated Oct. 13, 2015 for International Application No. PCT/JP2015/069831, with an English translation of the International Search Report.

Written Opinion of the International Searching Authority and International Search Report, dated Oct. 13, 2015, for International Application No. PCT/JP2015/069832, with an English translation of the International Search Report.

Written Opinion of the International Searching Authority and International Search Report, dated Oct. 13. 2015, for International Application No. PCT/JP2015/069834, with an English translation of the International Search Report.

Yanming et al., "Polymer Structure and Properties," East China University of Science and Technology Press, Jan. 31, 2010, pp. 278-279 (3 pages total).

Zhao et al., "Effect of Coupling Agent on Properties of Silica Z1115MP Filled SSBR/BR Compound," Journal of Qingdao University of Science and Technology(Natural Science Edition), vol. 34, No. 4, Aug. 2013, pp. 387-392, with an English abstract.

\* cited by examiner

METHOD FOR KNEADING A POLYMER

CROSS-REFERENCE TO RELATED APPLICATIONS

This application is a Divisional of U.S. application Ser. No. 15/784,930, filed on Oct. 16, 2017, which claims priority under 35 U.S.C. § 119(a) to Application No. 2016-213181, filed in Japan on Oct. 31, 2016, all of which are hereby expressly incorporated by reference into the present application.

TECHNICAL FIELD

The present invention relates to a polymer ready for introduction into a kneading machine, a rubber composition, and a pneumatic tire.

BACKGROUND ART

With the recent introduction of tire labeling systems in various countries, there is a need for rubber compounds that simultaneously have high-level properties, such as rolling resistance, abrasion resistance, and wet grip performance. To this end, various techniques have been developed.

In general, in order to exploit the potential properties of materials that constitute rubber compositions, various techniques have been proposed to improve the dispersibility of fillers because dispersibility of these materials, particularly fillers, contributes to improvement of the properties. Nevertheless, further improvement is needed.

SUMMARY OF INVENTION

Technical Problem

The present invention aims to solve the problem and provide a polymer ready for introduction into a kneading machine which is milled with good milling efficiency in a kneading machine and which provides a kneaded mixture with excellent filler dispersion. The present invention also provides a rubber composition and a pneumatic tire containing the polymer.

Solution to Problem

The present invention relates to a polymer ready for introduction into a kneading machine, excluding natural rubber, the polymer having a temperature within the range of $-20°$ C. to $80°$ C. and satisfying the following formula (I):

(Tip clearance $d$ of kneading machine)$^3 \leq$(Volume $V$ of polymer ready for introduction into kneading machine)$\leq 2.0 \times 10^4$ cm$^3$      (I).

The polymer ready for introduction into a kneading machine preferably has a quadrangular prism shape that satisfies $a \geq d$, $b \geq d$, and $c \geq d$, wherein a, b, and c represent length, width, and height of the quadrangular prism shape, respectively.

The present invention also relates to a rubber composition, containing the polymer ready for introduction into a kneading machine.

The present invention also relates to a pneumatic tire, containing the rubber composition.

Advantageous Effects of Invention

Since the polymer ready for introduction into a kneading machine of the present invention, excluding natural rubber, satisfies formula (I) and has a temperature within the range of $-20°$ C. to $80°$ C., the polymer is milled with good milling efficiency in a kneading machine, and further the polymer provides a kneaded mixture with excellent filler dispersion.

DESCRIPTION OF EMBODIMENTS (Polymer Ready for Introduction into Kneading Machine)

The polymer ready for introduction into a kneading machine of the present invention (polymer immediately before being introduced into a kneading machine) is a polymer excluding natural rubber which satisfies formula (I) and has a temperature within a predetermined range.

As the polymer such as rubber to be introduced into and kneaded in a kneading machine in the present invention, a polymer species excluding natural rubber, such as polybutadiene rubber or styrene-butadiene rubber, is selected, and the size of the polymer species is adjusted so as to satisfy formula (I). Further, the polymer temperature, i.e. the temperature of the polymer before being introduced into a kneading machine is adjusted to fall within a predetermined range. Such a polymer can be milled with good milling efficiency (efficiency of milling the polymer) in a kneading machine, and further can provide a kneaded composition with good filler dispersion, without particularly changing materials.

The polymer ready for introduction into a kneading machine satisfies the following formula (I):

(Tip clearance $d$ of kneading machine)$^3 \leq$(Volume $V$ of polymer ready for introduction into kneading machine)$\leq 2.0 \times 10^4$ cm$^3$      (I).

The tip clearance d (tip clearance distance in cm) represents the gap between the mixing chamber and the rotor tip or disc tip. Since the volume V (cm$^3$) of the polymer ready for introduction into a kneading machine is equal to or more than the value of (Tip clearance d of kneading machine)$^3$ (cm$^3$), the size of the polymer is larger than the distance between the tip and the wall surface or between the tips, and therefore shear is applied to the polymer during kneading. Thus, good polymer milling and good filler dispersion can be obtained. The volume V preferably satisfies $V$ (cm$^3$)$\geq 1.5$ $d^3$ (cm$^3$), more preferably $V$ (cm$^3$)$\geq 2.0$ $d^3$ (cm$^3$).

Also since the volume V is equal to or less than $2.0 \times 10^4$ cm$^3$, the length of time required for the polymer to reach a size such that it can enter into the tip clearance where the greatest force is applied is reduced, resulting in excellent productivity.

The particular appropriate value and tip clearance distance vary depending on the kneading machine. However, the appropriate value falls within the range defined by the formula regardless of the type of kneading machine because the same principle applies that shear cannot be applied to a polymer with a size that is not larger than the tip clearance.

The polymer ready for introduction into a kneading machine may have any shape that satisfies formula (I), for example, a prism shape such as a quadrangular prism shape (e.g. cube, cuboid) or a triangular prism shape; a cylindrical shape (e.g. elliptic cylinder); or a spherical shape (e.g. true sphere, oval sphere).

In particular, the polymer preferably has a quadrangular prism shape that satisfies a (cm)$\geq d$ (cm), b (cm)$\geq d$ (cm), and c (cm)$\geq d$ (cm), where a, b, and c represent the length (cm), the width (cm), and the height (cm) of the quadrangular prism shape, respectively, and d represents the tip clearance. In this case, good polymer milling and good filler dispersion can be obtained.

The polymer ready for introduction into a kneading machine is introduced into and kneaded in a kneading machine. Conventional kneading machines can be used as the kneading machine. Examples include closed equipment such as Banbury mixers and kneaders, and open roll mills. Among these, closed Banbury mixers are preferred. The rotor may have either a tangential or intermeshing configuration. For example, a 236 L closed Banbury mixer (F270, available from Kobe Steel, Ltd., rotor diameter: 560 mm, tip clearance: 8 mm) may be used.

The polymer ready for introduction into a kneading machine has a temperature within the range of −20° C. to 80° C. Thus, since the temperature of the polymer to be introduced into a kneading machine is adjusted to fall within the above range, good shear force is applied during kneading, and therefore excellent polymer milling efficiency and excellent filler dispersion can be obtained. Particularly when the polymer having a lower temperature is introduced, higher initial shear force is applied, so that the polymer is more finely milled to increase the surface area that contacts other materials, thereby resulting in improved physical properties. The temperature is preferably 0° C. to 30° C., more preferably 0° C. to 10° C., particularly suitably around 5° C.

The polymer ready for introduction into a kneading machine excludes natural rubber (NR). NR is known to be better dispersed after storage at low temperatures (crystallization), whereas polymers other than NR are not crystallized. Hence, it has been thought by the skilled person that low temperature conditions are not very effective for polymers other than NR. The present invention is contrary to such common general knowledge, and relates to polymers that are not crystallized at low temperatures, such as polybutadiene rubber and styrene-butadiene rubber, whose temperature is adjusted to fall within the above range and whose size is also adjusted to thereby obtain good polymer milling efficiency and good filler dispersion.

Examples of polymer species that can be used as the polymer ready for introduction into a kneading machine include polybutadiene rubber (BR), styrene-butadiene rubber (SBR), chloroprene rubber (CR), acrylonitrile-butadiene rubber (NBR), ethylene-propylene-diene rubber (EPDM), butyl rubber (IIR), and halogenated butyl rubber (X-IIR). Preferred among these is BR or SBR. SBR and BR may each be any one known in the tire field.

(Rubber Composition)

The polymer ready for introduction into a kneading machine of the present invention can be used in rubber compositions for tires and other applications.

The rubber composition containing the polymer ready for introduction into a kneading machine can be prepared by, for example, a method that includes a mastication step including masticating the polymer ready for introduction into a kneading machine and a base kneading step including kneading a masticated polymer obtained in the mastication step with a filler.

In the mastication step, a polymer other than NR, such as SBR or BR, is masticated. In the mastication step, only the polymer is kneaded using a kneading machine. The kneading (mastication) can be carried out using the aforementioned kneading machines. In the mastication step, the kneading time is preferably 0 to 5 minutes, and the polymer temperature during kneading (the temperature of the masticated polymer) is preferably 20° C. to 120° C.

By kneading the polymer that has a temperature of −20° C. to 80° C. at the start of kneading until the temperature falls within the above range, the polymer is finely milled to increase the surface area that contacts other materials, thereby resulting in improved physical properties.

The rotational speed of the kneading machine in the mastication step is not particularly limited, and may appropriately be selected depending on the type of kneading machine used to ensure dispersibility, productivity, and other properties.

In the base kneading step, the masticated polymer obtained in the mastication step is kneaded with a filler. The kneading (base kneading) can be carried out using the aforementioned kneading machines. In the base kneading step, the kneading time is preferably 1 to 15 minutes, and the polymer temperature during kneading (the temperature of the kneaded mixture) is preferably 120° C. to 170° C.

Examples of the filler include those known in the tire field, such as silica and carbon black.

The silica, if used, may appropriately be selected depending on the intended properties. For example, the silica may have a nitrogen adsorption specific surface area ($N_2SA$) of 50 to 300 $m^2/g$, preferably 100 to 250 $m^2/g$. The $N_2SA$ of the silica is determined by BET method in accordance with ASTM D3037-81.

The carbon black, if used, may also appropriately be selected depending on the intended properties. For example, the carbon black may have a nitrogen adsorption specific surface area ($N_2SA$) of 30 to 300 $m^2/g$, preferably 50 to 200 $m^2/g$. The $N_2SA$ of the carbon black can be determined in accordance with JIS K 6217-2:2001.

If silica is introduced in the base kneading step, a silane coupling agent is preferably also introduced. Examples of the silane coupling agent include sulfide silane coupling agents, vinyl silane coupling agents, amino silane coupling agents, glycidoxy silane coupling agents, nitro silane coupling agents, and chloro silane coupling agents.

In the base kneading step, in addition to the polymer, filler, and silane coupling agent, additional components may be introduced and kneaded therewith. Examples of the additional components include oils, stearic acid, and antioxidants.

The base kneading step is usually followed by a final kneading step that includes kneading the kneaded mixture obtained in the base kneading step with a vulcanizing agent. The kneading (final kneading) can be carried out using the aforementioned kneading machines. In the final kneading step, the kneading time is preferably 1 to 15 minutes, and the polymer temperature during kneading (the temperature of the kneaded mixture) is preferably 80° C. to 120° C.

The vulcanizing agent introduced in the final kneading step may be any chemical capable of crosslinking a rubber component, such as sulfur.

In the final kneading step, in addition to the vulcanizing agent, additional components may be introduced and kneaded. Examples of the additional components include vulcanization accelerators. Examples of the vulcanization accelerators include known ones such as sulfenamides, guanidines, thiazoles, thiurams, dithiocarbamates, thioureas, and xanthates.

After the final kneading step, the kneaded mixture obtained in the final kneading step (unvulcanized rubber composition) is usually vulcanized. The vulcanization temperature is preferably 150° C. to 200° C., and the vulcanization time is preferably 5 to 15 minutes.

The rubber composition of the present invention containing the polymer ready for introduction into a kneading machine can be prepared as described above or by other methods. The ratio of the materials in the rubber composition of the present invention, such as the polymer, filler, silane coupling agent, vulcanizing agent, and vulcanization accelerator, may appropriately be selected depending on the intended properties and other factors.

For example, the total amount of fillers, such as silica and carbon black, is preferably 10 to 200 parts by mass per 100 parts by mass of the rubber component including the polymer. The amount of silane coupling agent is preferably 0.5 to 20 parts by mass per 100 parts by mass of silica. The amount of vulcanizing agent is preferably 0.1 to 8 parts by mass, and the amount of vulcanization accelerator is preferably 0.5 to 10 parts by mass, each per 100 parts by mass of the rubber component including the polymer.

(Pneumatic Tire)

The polymer ready for introduction into a kneading machine of the present invention may be used in pneumatic tires.

For example, the kneaded mixture (unvulcanized rubber composition) obtained in the final kneading step may be extruded into the shape of a tire component such as a tread, formed on a tire building machine in a conventional manner, and assembled with other tire components to build an unvulcanized tire, which is then heated and pressurized in a vulcanizer to produce a tire.

EXAMPLES

The present invention is specifically described with reference to examples but is not limited only thereto.

The chemicals used in the examples and comparative examples are listed below.
BR: BR-150B available from Ube Industries, Ltd.
Silica: Ultrasil VN3 ($N_2SA$: 175 m²/g) available from Evonik
Oil: Vivatec 500 (TDAE oil) available from H&R
Stearic acid: stearic acid beads "TSUBAKI" available from NOF Corporation
Antioxidant: NOCRAC 6C (N-(1,3-dimethylbutyl)-N-phenyl-p-phenylenediamine) available from Ouchi Shinko Chemical Industrial Co., Ltd.
Zinc oxide: zinc oxide #2 available from Mitsui Mining and Smelting Co., Ltd.
Sulfur: sulfur powder available from Tsurumi Chemical Industry Co., Ltd.
Vulcanization accelerator 1: Nocceler D (N,N'-diphenylguanidine) available from Ouchi Shinko Chemical Industrial Co., Ltd.
Vulcanization accelerator 2: Nocceler NS (N-tert-butyl-2-benzothiazolylsulfenamide) available from Ouchi Shinko Chemical Industrial Co., Ltd.

<Preparation of Rubber Composition>

An unvulcanized rubber composition was prepared by the following kneading steps (1) to (3) according to the formulation shown in Table 1, and the size (quadrangular prism shape) and temperature of the polymer to be introduced shown in Table 2. In steps (1) and (2), a 236 L closed Banbury mixer (F270, available from Kobe Steel, Ltd., rotor diameter: 560 mm, tip clearance: 8 mm) was used, and in step (3) an open roll mill was used.

(1) A mastication step including masticating the polymer (kneading at 100° C. for 5 minutes followed by discharge)
(2) A base kneading step including introducing and kneading the remaining materials, excluding the vulcanizing chemicals (sulfur, vulcanization accelerators) (kneading at 165° C. for 10 minutes followed by discharge)
(3) The sulfur and vulcanization accelerators were added to and kneaded with the base-kneaded mixture to obtain an unvulcanized rubber composition (80° C., 5 minutes).

In steps (1) and (2), kneading was carried out at a predetermined rotational speed, and after a lapse of a predetermined time the rubber compound was discharged.

(Evaluation)

In the examples and comparative examples, the following evaluations were performed. The results are shown in Table 2.

(Torque (Polymer Milling Efficiency))

Torque (instantaneous power) is considered as a measure of shear force applied during kneading, and a higher torque indicates that a greater force is applied to the materials in the chamber. Hence, torque naturally decreases as the materials are sufficiently milled and dispersed. Accordingly, a parameter (Δtorque) indicative of changes in materials caused by kneading as defined by the following formula was determined.

Δtorque=(torque (kW/kg) after mastication step)/ (torque (kW/kg)

at the time of introducing the material in mastication step)

A smaller Δtorque indicates that more progress has been made in milling by mastication compared to that at the time of introduction. This corresponds to an increase in the surface area that contacts other materials, particularly fillers, which can be expected to result in improved physical properties.

(Filler Dispersion)

The unvulcanized rubber composition was measured for G* at a strain of 0.5%, 1%, 2%, 4%, 8%, 16%, 32%, and 64% at 100° C. and 1 Hz using an RPA 2000 tester available from Alpha Technologies. The Payne effect was determined from the difference between the maximum G* and the minimum G* using the following equation:

ΔG*=(maximum G*−minimum G*)/(maximum G*).

Effective kneading promotes filler dispersion. A smaller ΔG* indicates good filler dispersion. In order to extract the pure effect of filler dispersion, the G* was measured on the unvulcanized rubber composition.

In order to evaluate the balance of polymer milling efficiency and filler dispersion, the item "Δtorque+ΔG*" was additionally evaluated. A smaller value indicates a better balance of the properties.

TABLE 1

|  |  |  | Formulation |
|---|---|---|---|
| Amount (parts by mass) | Mastication | BR | 100 |
|  | Base kneading | Silica | 50 |
|  |  | Oil | 15 |
|  |  | Stearic acid | 2 |
|  |  | Antioxidant | 2.5 |
|  |  | Zinc oxide | 2 |
|  | Final kneading | Sulfur | 2 |
|  |  | Vulcanization accelerator 1 | 2 |
|  |  | Vulcanization accelerator 2 | 1.5 |

TABLE 2

| | Comparative Example 1 | Example 1 | Example 3 | Example 5 | Comparative Example 3 |
|---|---|---|---|---|---|
| Size (cm³) of polymer introduced [a(cm) × b(cm) × c(cm)] | Very small (0.5 × 0.5 × 0.5) | Small (5 × 5 × 5) | Middle (8 × 10 × 10) | Large (20 × 45 × 10) | Very large (40 × 60 × 10) |
| Temperature (° C.) of polymer to be introduced | 5 | 5 | 5 | 5 | 5 |
| ΔTorque | 0.96 | 0.68 | 0.43 | 0.48 | 0.56 |
| ΔG* | 0.52 | 0.43 | 0.52 | 0.70 | 0.84 |
| ΔTorque + ΔG* | 1.48 | 1.11 | 0.95 | 1.18 | 1.40 |

| | Comparative Example 2 | Example 2 | Example 4 | Example 6 | Comparative Example 4 |
|---|---|---|---|---|---|
| Size (cm³) of polymer introduced [a(cm) × b(cm) × c(cm)] | Very small (0.5 × 0.5 × 0.5) | Small (5 × 5 × 5) | Middle (8 × 10 × 10) | Large (20 × 45 × 10) | Very large (40 × 60 × 10) |
| Temperature (° C.) of polymer to be introduced | 50 | 50 | 50 | 50 | 50 |
| ΔTorque | 0.87 | 0.67 | 0.55 | 0.56 | 0.65 |
| ΔG* | 0.49 | 0.39 | 0.59 | 0.67 | 0.79 |
| ΔTorque + ΔG* | 1.36 | 1.06 | 1.14 | 1.23 | 1.44 |

| | Comparative Example 5 | Comparative Example 6 |
|---|---|---|
| Size (cm³) of polymer introduced [a(cm) × b(cm) × c(cm)] | Small (5 × 5 × 5) | Large (20 × 45 × 10) |
| Temperature (° C.) of polymer to be introduced | 100 | 100 |
| ΔTorque | 1.00 | 0.94 |
| ΔG* | 0.45 | 0.66 |
| ΔTorque + ΔG* | 1.45 | 1.60 |

Table 2 shows that the values of Δtorque, ΔG*, and Δtorque+ΔG* were small, and excellent polymer milling efficiency and excellent filler dispersion were exhibited in the examples where a polymer with a predetermined size whose temperature at the time of introduction into the kneading machine was 5° C. or 50° C. was introduced and masticated.

For easy understanding of the principle of the present invention, minimum materials were used in Tables 1 and 2. In cases where fillers are introduced into tires, the dispersion of the fillers contributes to the properties of the tires. Therefore, substantially the same results as in Tables 1 and 2 were obtained when the amount of materials introduced was increased.

The invention claimed is:

1. A method for kneading a polymer and a filler comprising:
   introducing a single piece of a polymer and a filler into a kneading machine and
   kneading the single piece of the polymer and the filler in the kneading machine to form a kneaded product of the polymer and the filler,
   wherein
   the polymer excludes natural rubber,
   the temperature of the polymer is within the range of −20° C. to 80° C., and
   the kneading machine and single piece volume satisfy the following formula (I):

(Tip clearance $d$ of kneading machine)³ ≤(Volume $V$ of the single piece of the polymer and filler ready for introduction into kneading machine) <2.0×10⁴ cm³ (I).

2. The method for kneading a polymer and a filler according to claim 1, wherein the single piece of the polymer has a quadrangular prism shape that satisfies
   a≥d, b≥d, and c≥d,
   wherein a, b, and c represent length, width, and height of the quadrangular prism shape, respectively.

3. The method for kneading a polymer and a filler according to claim 1, wherein the polymer comprises one or more species selected from the group consisting of polybutadiene rubber, styrene-butadiene rubber, chloroprene rubber, acrylonitrile-butadiene rubber, ethylene-propylene-diene rubber, butyl rubber and halogenated butyl rubber.

4. The method for kneading a polymer and a filler according to claim 2, wherein the polymer comprises one or more species selected from the group consisting of polybutadiene rubber, styrene-butadiene rubber, chloroprene rubber, acrylonitrile-butadiene rubber, ethylene-propylene-diene rubber, butyl rubber and rubber halogenated butyl rubber.

5. The method for kneading a polymer and a filler according to claim 1, wherein the polymer comprises one or more species selected from polybutadiene rubber and styrene-butadiene rubber.

6. The method for kneading a polymer and a filler according to claim 2, wherein the polymer comprises one or more species selected from polybutadiene rubber and styrene-butadiene rubber.

7. The method for kneading a polymer and a filler according to claim 1, wherein the single piece volume of V satisfies the following formula:

$V$ (cm³)≥2.0 $d^3$ (cm³).

8. The method for kneading a polymer and a filler according to claim 1, wherein the temperature of the polymer is within the range of 0° C. to 10° C.

9. The method for kneading a polymer and a filler according to claim 1, wherein the filler comprises one or more species selected from silica and carbon black.

* * * * *